United States Patent
Varone et al.

(10) Patent No.: US 8,745,407 B2
(45) Date of Patent: Jun. 3, 2014

(54) VIRTUAL MACHINE OR HARDWARE PROCESSOR FOR IC-CARD PORTABLE ELECTRONIC DEVICES

(75) Inventors: Francesco Varone, Bellona (IT); Pasquale Vastano, S. Maria Capua Vetere (IT); Amedeo Veneroso, Ercolano (IT)

(73) Assignee: STMicroelectronics N.V., Geneva (CH)

( * ) Notice: Subject to any disclaimer, the term of this patent is extended or adjusted under 35 U.S.C. 154(b) by 1398 days.

(21) Appl. No.: 11/912,936

(22) PCT Filed: May 2, 2006

(86) PCT No.: PCT/EP2006/004069
§ 371 (c)(1),
(2), (4) Date: Jan. 15, 2008

(87) PCT Pub. No.: WO2007/000207
PCT Pub. Date: Jan. 4, 2007

(65) Prior Publication Data
US 2008/0276100 A1    Nov. 6, 2008

(30) Foreign Application Priority Data
Apr. 29, 2005  (EP) .................................... 05009410

(51) Int. Cl.
*G06F 12/14* (2006.01)
(52) U.S. Cl.
USPC ......................................................... 713/190
(58) Field of Classification Search
USPC .............................. 713/152, 193, 190; 380/44
See application file for complete search history.

(56) References Cited

U.S. PATENT DOCUMENTS

| | | | | |
|---|---|---|---|---|
| 4,558,176 | A | * | 12/1985 | Arnold et al. .................. 713/190 |
| 5,034,980 | A | * | 7/1991 | Kubota ......................... 713/189 |
| 5,073,934 | A | * | 12/1991 | Matyas et al. .................. 380/30 |
| 5,563,945 | A | * | 10/1996 | Gercekci ........................ 713/190 |
| 2001/0037450 | A1 | | 11/2001 | Metlitski et al. ............... 713/152 |
| 2003/0163718 | A1 | | 8/2003 | Johnson et al. ............... 713/193 |
| 2003/0217277 | A1 | * | 11/2003 | Narayanan .................... 713/187 |
| 2004/0136530 | A1 | | 7/2004 | Endo et al. ...................... 380/44 |
| 2005/0036618 | A1 | * | 2/2005 | Gammel et al. .............. 380/255 |
| 2005/0108507 | A1 | * | 5/2005 | Chheda et al. ................ 712/209 |

FOREIGN PATENT DOCUMENTS

| | | | | |
|---|---|---|---|---|
| EP | 0908810 | A2 | * 4/1999 | ............... G06F 1/00 |
| EP | 1126356 | | 8/2001 | |
| EP | 1253503 | | 10/2002 | |
| EP | 1253503 | A2 | * 10/2002 | |

* cited by examiner

*Primary Examiner* — Brandon Hoffman
(74) *Attorney, Agent, or Firm* — Allen, Dyer, Doppelt, Milbrath & Gilchrist, P.A.

(57) ABSTRACT

A virtual machine or hardware processor for an IC-card portable electronic device includes a non-volatile memory unit, a remote decryption unit, and associated objects for storing an executable program in an encrypted format in the non-volatile memory. The IC-card stores a licence key to encrypt and decrypt the executable program through an IC-card interface. The IC-card interface extracts and encrypts the operands of the plain executable program into encrypted operands so as to not limit performance. The remote decryption unit detects if an instruction contains encrypted operands, and queries a decryption to the IC-card interface. The IC-card interface decrypts the encrypted operands and re-encrypts the just decrypted operands into obscured operands through a dynamic obscuration key.

32 Claims, 10 Drawing Sheets

1. Fetch instruction
2. Decode instruction (Control Block)
3. Fetch operand from registers/stack
4. If cell is marked *obscured*, DEOBs decript values
5. Plain values are processed by ALU
6. Result is stored without *obscuration*.

VIRTUAL MACHINE OR HARDWARE PROCESSOR FOR IC-CARD PORTABLE ELECTRONIC DEVICES

FIELD OF THE INVENTION

The present invention relates to a virtual machine or hardware processor for IC-card portable electronic devices, such as digital assistants, smart phones and other similar devices. The IC-card portable electronic device includes a non-volatile memory unit for storing executable programs in an encrypted format, and memory elements for storing operands derived by the executable programs during execution. The executable programs in an encrypted format may be decrypted during execution by a remote decryption unit into corresponding decrypted executable programs.

The invention further relates to a method for encrypting and decrypting data in a virtual machine or hardware processor for an IC-card portable electronic device. More specifically, the present invention relates to a portable electronic system including an IC-card, with the electronic device comprising a virtual machine or a hardware processor, and a non-volatile memory unit.

BACKGROUND OF THE INVENTION

IC-card portable electronic devices like digital assistants, smart phones and other similar devices contain hardware components to store and execute executable program. In particular, a generic hardware architecture is formed by two main blocks. The first block comprises a non-volatile memory unit and a program counter. The second block comprises a data memory, registers and a stack, as schematically shown in FIG. 1.

IC-card portable electronic devices are often times based on a virtual machine architecture. The virtual machine architecture is implemented on top of a hardware architecture, and is similar to the one described above for a generic hardware architecture. Few differences can be noted. The virtual machine architecture is stack-based so that it has no general purpose registers. As stated for a generic hardware architecture, the virtual machine architecture also stores executable programs inside the non-volatile memory unit.

The virtual machine architecture provides a layer of abstraction between the compiled program and the underlying hardware architecture and operating system, playing a central role in portability.

A non-volatile memory unit, not depending on the machine architecture, is readable by connecting the IC-card portable electronic device to a PC through a specific interface or by using diagnostic software released by the device manufacturer, generally known as software drivers.

Software drivers can be also downloaded from manufacturer support Internet sites and, in the worst case, they can be copied and simulated by hackers. In this respect, non-volatile memory units cannot be considered a secure support for storing the plain version of an executable program.

Executable programs are stored in the non-volatile memory unit in a non-encrypted way because they are to be executed. Executable programs stored in a plain format are in danger because, potentially, they can be copied and reproduced.

Software providers may want to transmit or download executable programs in a secure manner so to prevent the executable programs from being stolen in the transmission channel, or across device interfaces.

European Patent Application No. 1,253,503 relates to the encryption of a source code intended to be executed in an electronic device in a high level programming language. More particularly, this document teaches that the security in communications between the electronic device and an IC-card can be improved by introducing scrambling-descrambling through an encrypted source code and an external unit in which a decryption key for decrypting the encrypted source code is stored.

A protection of mass data is instead described in U.S. Published Patent Application No. 2003/0163718, and is provided by mapping a plurality of virtual addresses onto randomly selected actual addresses.

Even the improved security cited in the above documents protects communications between an external unit and an electronic device, or the mass data storage. The tracking of the source code is not prevented during its execution in a virtual or hardware processor of the same electronic device. For example, this may be when an operand of the source code is temporary stored inside a register or a stack of the virtual or hardware processor of the electronic device.

U.S Published Patent Application No. 2004/0136530 describes a method to protect source code and/or generic data intended to be executed by an electronic device with encrypted data being identified through a corresponding extra bit present in each memory cell. In this case, a basic architecture of the electronic device, such as volatile and/or non-volatile memory structures, are modified to host the extra bits and the whole memory is encrypted using internal keys.

Another prior art document, U.S. Published Patent Application No. 2001/0037450 describers a method of developing a protected software application comprising identifying segments according to a protected instruction set. More particularly, a portion of a source code, coded in a first language and intended to be executed by an electronic device, is compiled in a second language and is decoded and executed in the second language by a processing unit external to the electronic device. An external processing unit is usually much slower and more limited than the electronic device. Moreover, implementing such an approach is usually expensive because it requires an additional external unit provided with higher computational power with respect to the power of the electronic device to improve security. This document also specifies that the source code in the first language is completely recompiled and is protected by an asymmetric cryptography.

In such an approach, even if the source code is protected, the execution is delayed because the entire portion of the source code is to be recompiled. The asymmetric cryptography is slower than symmetric cryptography, and introduces an additional delay. Moreover, this prior art document also does not prevent the tracking of a source code when its operands are temporary stored inside a register or a stack.

SUMMARY OF THE INVENTION

In view of the foregoing background, an object of the present invention is to provide executable programs to be stored in a secure manner in memory units of an electronic device.

This and other objects, advantages and features in accordance with the present invention are provided by not only encrypting the executable programs in the memory units, but also by encrypting operands of the executable programs when they are stored within a stack and/or registers of the electronic device. This may be even if stored temporarily, at the same time without interfering with the execution or the portability of the machine architecture. This may also be without limiting the performance with time consuming recompilations or encryption of an entire block of the executable program. This is substantially accomplished without changing the electronic device architecture, and overcomes the drawbacks cited with reference to the prior art.

A virtual machine or hardware processor for an IC-card portable electronic device may thus include a non-volatile memory unit that stores one or more executable programs in an encrypted format. The virtual machine or hardware processor may decrypt the executable programs in an encrypted format, and re-encrypt them during execution. This may insure that their temporary storage within the processor registers is also encrypted. The encryption may be executed contemporarily on a set of operands.

Accordingly, a first embodiment may relate to an integrated circuit device comprising a processor, a non-volatile memory for storing a plurality of executable programs in an encrypted format, and a plurality of memory elements for storing a plurality of operands derived by the plurality of executable programs in the encrypted format during execution. The integrated circuit device may further comprise a remote decryption unit for decrypting the plurality of executable programs in the encrypted format, with the encrypted format being derived by an encryption of a set of data of an executable program in a non-encrypted format. A re-encrypting circuit may re-encrypt the decrypted executable programs in the plurality of derived operands before storing in the plurality of memory elements. The processor may comprise a hardware processor or a virtual machine.

Another embodiment of the invention relates to a method for encrypting and decrypting data in a processor for a portable electronic device, wherein the portable electronic device comprises a non-volatile memory, a plurality of memory elements, a remote decryption unit and a re-encrypting circuit. The method may comprise storing a plurality of executable programs in an encrypted format in the non-volatile memory, storing in the plurality of memory elements a plurality of operands derived by the plurality of executable programs in the encrypted format during execution, and decrypting by the remote decryption unit the plurality of executable programs in the encrypted format. The encrypted format may be derived by an encryption of a set of data of an executable program in a non-encrypted format. The method may further comprise re-encrypting by the re-encrypting circuit the decrypted executable programs in the plurality of derived operands before storing in the plurality of memory elements.

The features and the advantages of the machine architecture and of the encryption method according to the present invention will be apparent from the following description of an embodiment thereof, made with reference to the annexed drawings, given for illustrative and non-limiting purposes.

DETAILED DESCRIPTION OF THE PREFERRED EMBODIMENTS

Figure 1:
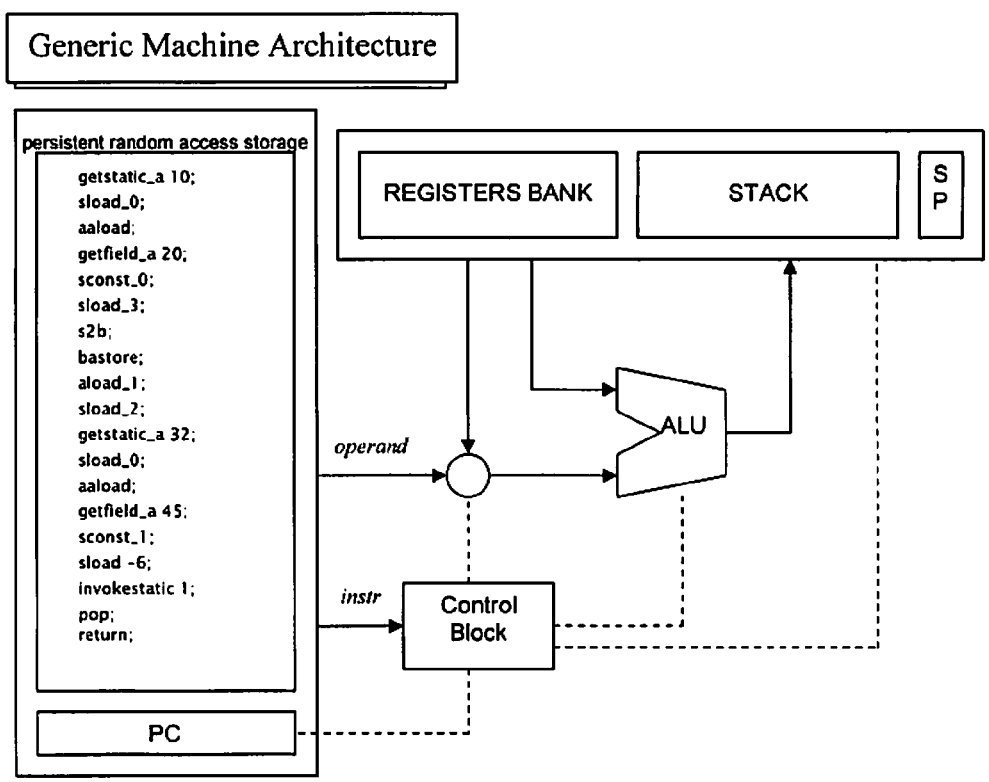
FIG. 1 shows a simplified and schematic representation of a generic machine architecture, according to the prior art.
Figure 2:
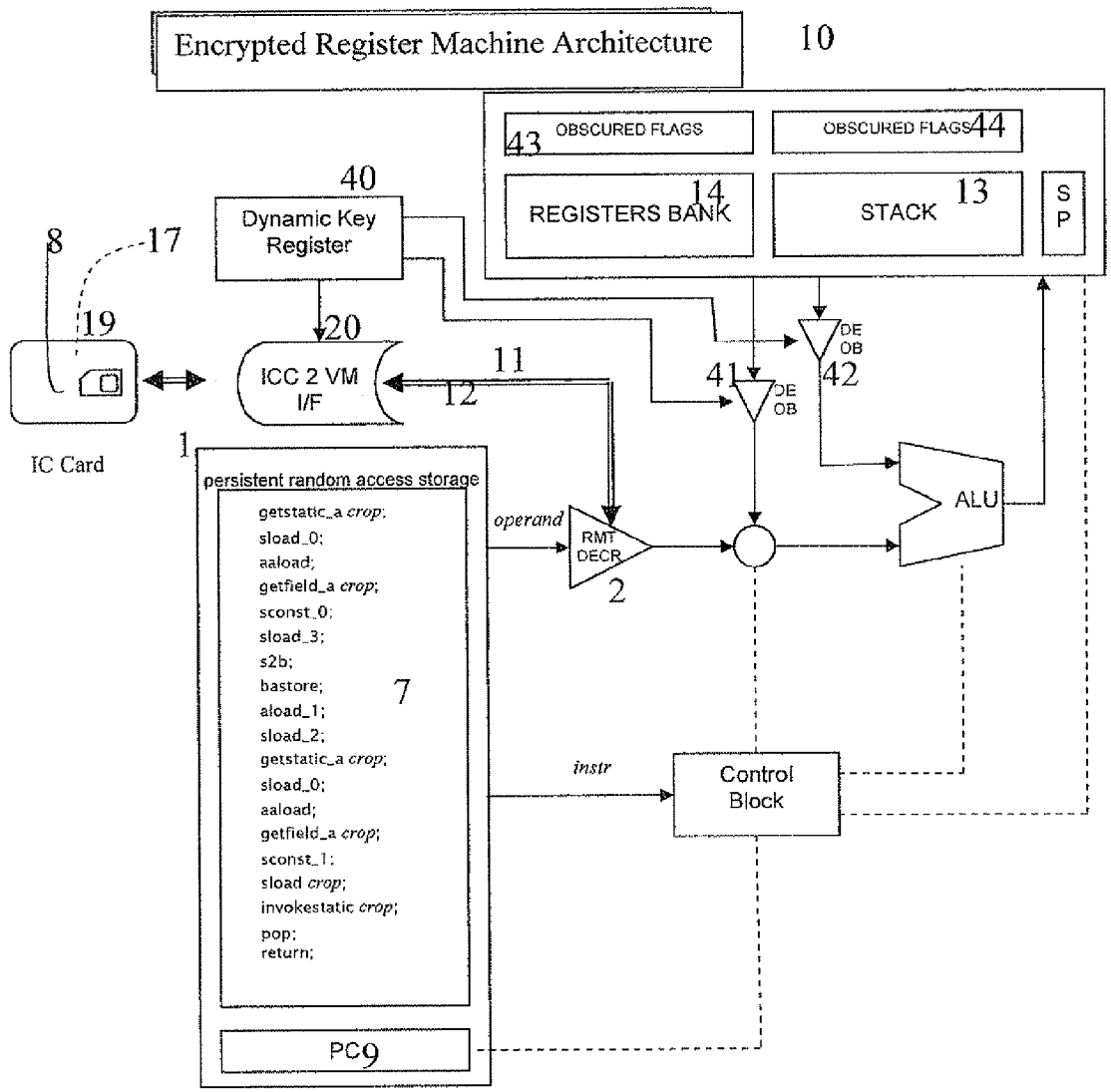
FIG. 2 shows, in a simplified and schematic representation, an encrypted register machine architecture including a Remote Description Unit, according to the present invention.

With reference to FIG. 2, a virtual machine or hardware processor for IC-card portable electronic devices is represented with reference number 10. In particular, the virtual machine or hardware processor includes a non-volatile memory unit 1 storing a plurality of executable programs in an encrypted format 7, a program counter 9, a stack 13 and a register bank 14. Also represented in FIG. 2 is an IC-card Interface 20 between the IC-card 19 and the virtual machine or hardware processor 10.

Advantageously, the virtual machine or hardware processor 10 including the non-volatile memory unit I is comprises a Remote Decryption Unit 2 and associated means or modules for storing executable programs in an encrypted format 7 in the non-volatile memory unit 1, and for re-encrypting and executing the executable program.

The executable programs in an encrypted format 7 stored within the non-volatile memory unit 1 are encrypted, for example, through an encryption algorithm not considered herein because it is conventional. Advantageously, the tracking of the executable program in the encrypted format is also during its execution within the virtual machine or hardware processor when it is already decrypted by the Remote Decryption Unit 2.

In fact, after the Remote Decryption Unit 2 decrypts the executable program 7 in an encrypted format, a plurality of objects is provided to perform additional encryptions on the decrypted executable program. The additional encryption is intended to allow, inside the register bank 14 or stack 13 of the hardware or software processor, a loading of encrypted programs or non-plain operands.

Figure 3:
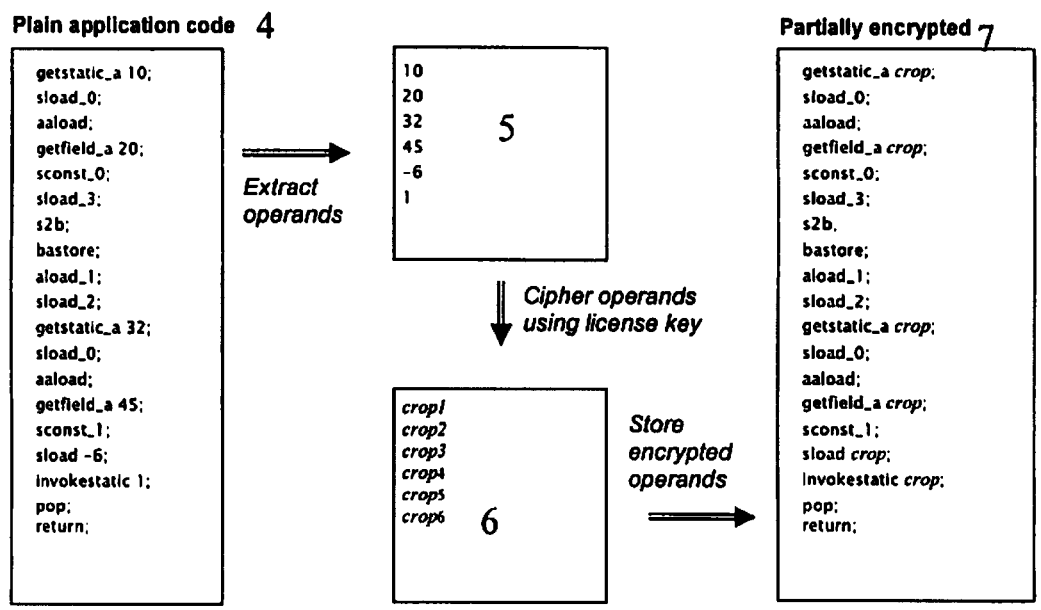
FIG. 3 shows a simplified and schematic representation of the executable program encryption, according to the present invention.
Figure 4:
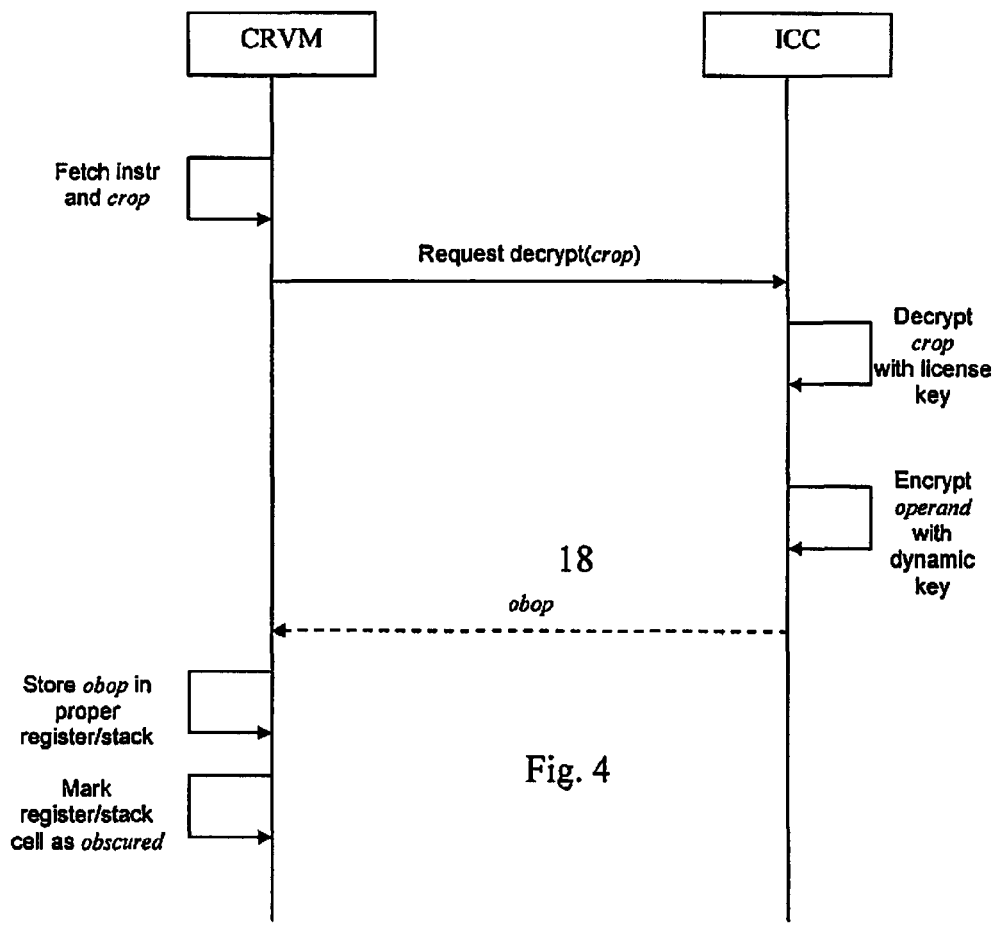
FIG. 4 represents the IC-card Interface decryption of encrypted operands (through a licence key) and the subsequent encryption into obscured operands (through a dynamic key), according to the present invention.

More particularly, the virtual machine or hardware processor comprises an IC-card 19 storing a licence key 8 and an IC-card Interface 20 for decrypting the executable program in an encrypted format 7 into a plain executable program 4 through the licence key 8, as shown in FIG. 3. The IC-card Interface 20 decrypts only the operands 6 of the executable program in the encrypted format 7 into decrypted operands 5.

The Remote Decryption Unit 2 detects if an instruction contains encrypted operands 6, and queries a decryption 11 to the IC-card Interface 20. The IC-card Interface 20 decrypts encrypted operands 6 through the licence key 8.

A dynamic obscuration key 17 is generated periodically by the virtual machine or hardware processor 10, for example, during the start up of every communication session between the IC-card 19 and the Virtual machine or hardware processor 10. The obscuration key 17 is stored both in the IC-card 19 and in the virtual machine or hardware processor 10, and is used to encrypt the just decrypted encrypted operands 6 into obscured operands 18. The IC-card Interface 20 returns the obscured operands 18 to the Remote Decryption Unit 2.

In this way, when an encrypted operand 6 is decrypted it is immediately re-encrypted through the dynamic obscuration key 17. This is to protect such an operand against a potential attack that occurs when it is temporary stored for execution. In other words, the virtual machine or hardware processor protects operands that are temporary stored in the register bank 14 and/or stored in the stack 13, as well as operands stored in any storage device intended to manage such operands during execution.

With reference to FIG. 2, a virtual machine or hardware processor 10 is schematically represented, as noted above. In particular, the non-volatile memory unit is indicated with reference number 1, the program counter with reference number 9, the register bank with reference number 14 and the stack with reference number 13.

Figure 7:
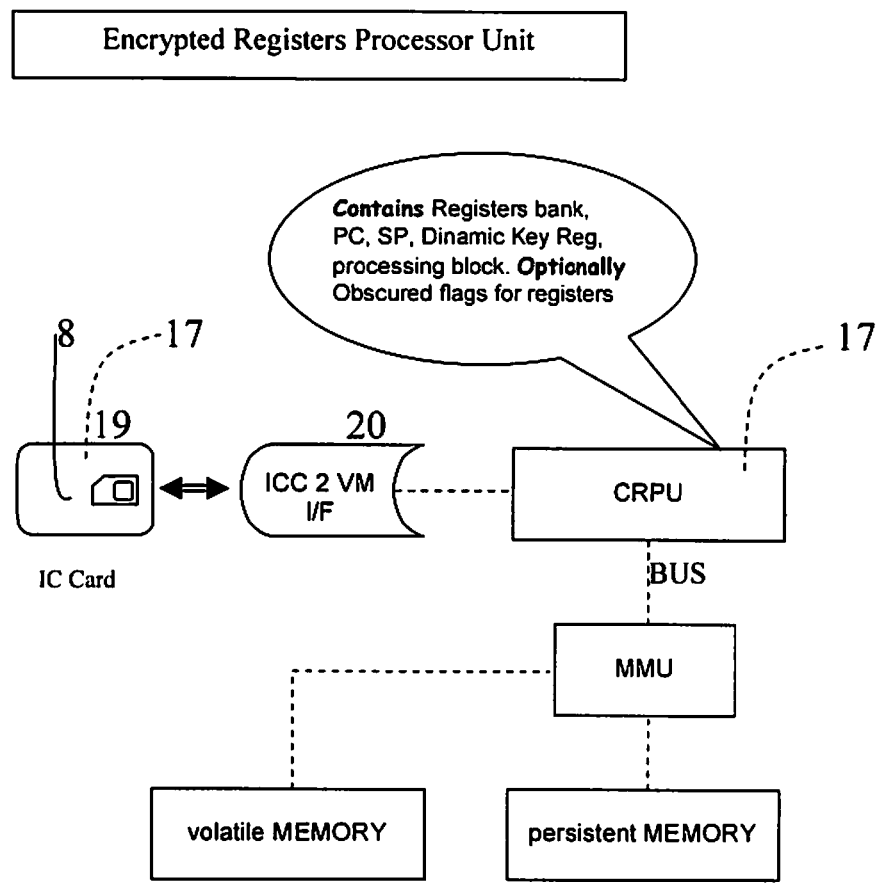
FIG. 7 shows a hardware version of the described architecture, according to the present invention.

In the same FIG. 2, also represented is the IC-card Interface 20 interfacing the IC-card 19 with the virtual machine or hardware processor 10. A licence key 8 is stored in the IC-card 19, as shown in FIG. 7. More particularly, the Remote Decryption Unit 2 is connected with the non-volatile memory unit 1 and the IC-card Interface 20. A Dynamic Key Register block 40 is connected with two de-obscure units 41 and 42 and with the IC-card Interface 20. The register bank 14 and the stack 13 are associated with corresponding obscure flags 43 and 44.

An executable program in an encrypted format 7 is stored in the non-volatile memory unit 1. The executable program in the encrypted format 7 is obtained from an encrypting phase of a plain executable program 4 described herein as a preferred embodiment.

More particularly, the whole plain executable program 4 is not totally encrypted. The operands 5 are recognized and extracted from the plain executable program 4, as shown in FIG. 3. The way operands 5 are encrypted into encrypted operands 6 to produce an executable program in an encrypted format 7 is not relevant, and we can assume that a generic server performs this operation through a licence key 8.

For a better understanding, the encryption process is schematically shown in FIG. 3. The extracted operands 5 are transformed into encrypted operands 6. The encrypted operands 6 are re-aggregated with the remaining code belonging to a plain executable program 4 into a partially encrypted executable program 7. The partially encrypted executable program 7 is finally stored within the non-volatile memory unit 1.

Advantageously, the strategy of encrypting operands only, allows the performance of the machine architecture not to be damaged because operands represent a small although vital part of the executable code. An estimate on a Java Card assembly code (like the one shown in FIG. 2), where the values 0, 1, 2, 3 are often implicit in the operative code, says that explicit operands represent about 10% of the whole code.

The same licence key 8 used from the generic server is stored on the IC-card 19. It provides a secure support from the point of view of the executable code, since it can be transferred from and to the device with no security problem. More generally, an IC-card could also execute many kinds of applications but it is much slower than modern smart-phones or other similar devices, and for this reason, the application resides in the device to be efficiently executed.

The executable program in the encrypted format 7, stored in the non-volatile memory unit 1, is to be executed from the virtual machine or hardware processor 1. When an instruction is fetched from the non-volatile memory unit 1, the Remote Decryption Unit 2 is responsible to detect if the instruction contains an encrypted operand 6 or not. In the first case, the Remote Decryption Unit 2 queries a decryption to the IC-card Interface 20, as schematically shown with reference number 11 in FIG. 2.

The IC-card Interface 20 decrypts the encrypted operand 6 through the licence key 8 stored inside the IC-card 19. The IC-card Interface 20, before returning the values of the operand, performs an additional encryption based on a dynamic obscuration key 17.

Advantageously, this additional encryption prevents the tracking of the operands also during its fetching for execution, for example, in the register bank 14 or in the stack 13. Such additional encryption is intended to allow, in the register bank 14 or stack 13 of the hardware or software processor, only a loading of encrypted operands or non-plain operands.

Figures 5, 6:
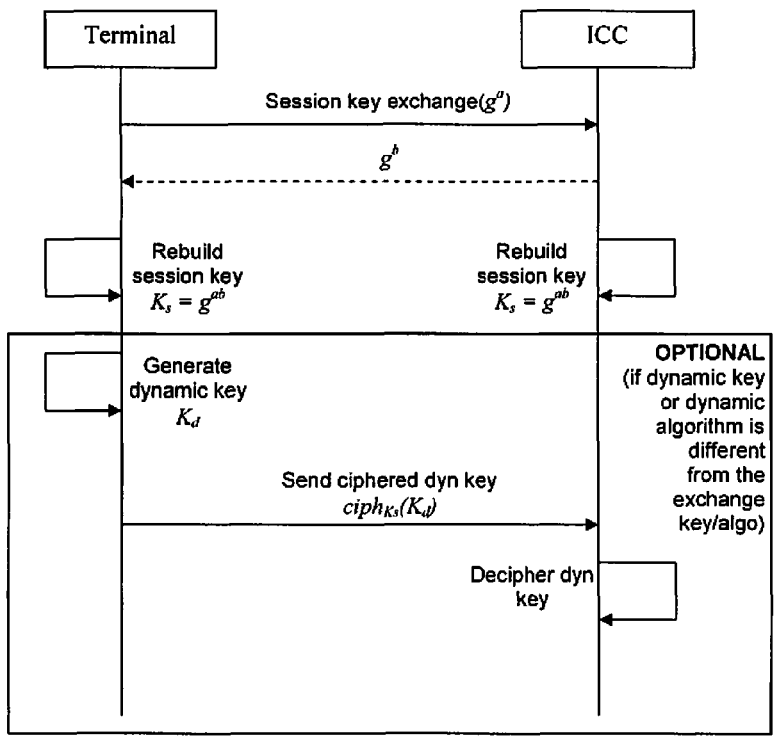
FIG. 5 shows schematically the obscuration of encrypted operands using the Diffie-Hellman key exchange protocol, according to the present invention.
FIG. 6 lists six steps performed by the security system, according to the present invention.

The dynamic obscuration key 17 is generated by the virtual machine or hardware processor 10, usually when execution starts, and is sent to the IC-card 19 when needed, for example, using the protocol shown in FIG. 5. This protocol follows, for instance, the Diffie-Hellman key exchange protocol. As shown in FIG. 2, the dynamic obscuration key 17 is stored in a dynamic key register unit 40.

As an alternative, the complexity of the algorithm for generating the dynamic obscuration key 17 may be chosen according to the need of the subsequent obscuration phases.

An additional obscuration is performed to make safer the executable program also during the run time. The obscuration algorithm is preferred to be much weaker than the one used to generate the encrypted operands 6 for performance reasons. Quality of the encrypting algorithms shall be balanced according to the IC-card 19 and channel speed. Data to be encrypted, however, is dynamic and the sensitivity is low to improve intrinsic qualities of the algorithms. Besides, a potential weakness of the obscuration algorithm is balanced by the randomness of the dynamic obscuration key.

As explained above, the IC-card Interface 20 encrypts the just decrypted encrypted operands 6 into obscured operands 18 through the dynamic obscuration key 17, and then returns the obscured operand 18 to the Remote Decryption Unit 2.

When the obscured operand 18 is returned to the virtual machine or hardware processor 10, it is stored in the stack 13 or in the register bank 14, and the obscure flag 43 or 44, associated respectively to the stack 13 or the register bank 14, are marked to remember that the value of the operand is not plain.

Since the registers are obscured, a potential access to a volatile memory does not allow an immediate recognition of the real value, even during the run time. Obscuration is not performed on aggregate data but on an elementary cell, at the register level, so that even if the plain value is grabbed, it is difficult to understand its meaning in relevant context.

When the execution of the instruction needs the plain value of the obscured operand 18, the plain value is obtained through the de-obscure unit 41 or 42, according respectively to the fact that the obscure flag 43 or 44 has been marked.

Advantageously, the illustrated method not only protects communications between an IC-card electronic device, for example, a computer and the IC-card itself, but it also prevents tracking of the executable program during its execution inside the virtual or hardware processor of the IC-card electronic device. The virtual or hardware processor architecture is reinforced against possible attacks during the execution of the executable program.

A remote decryption unit is not only used to decrypt an already encrypted code, but additional objects with a dynamic obscuration key 17 are provided to perform an additional encryption on the code decrypted by the remote decryption unit.

Such additional encryption is intended to load in the registers of the hardware or software processor only obscured operands. Also, in the stack of the hardware or software processor are loaded only obscured operands.

To optimize the performance of the virtual machine or hardware processor, many operands 5 can be collected and encrypted in a single encryption pass. This should enhance the quality of encryption, and should reduce the occurrence of the transfers between the virtual machine or hardware processor 10 and the IC-card 19.

Advantageously, a group of operands 5 may be encrypted through a single transfer between the virtual machine or hardware processor 10 and the IC-card 19. In this way, the performance of the virtual machine or hardware processor in the execution of the executable program is not delayed by an encryption of single operators. Moreover, the virtual machine or hardware processor provides that, in an instruction composed of one or more operators and one or more operands, the encryption may be performed only on operands.

The memory units storing the encrypted operands, for example, the stack or the registers, are associated with a corresponding flag to specify that their contents are encrypted. Advantageously, an extra bit associated to an encrypted operand is not required to indicate that such an operand is encrypted so that the virtual machine or hardware processor does not require changing to the memory unit architecture.

Figure 11:
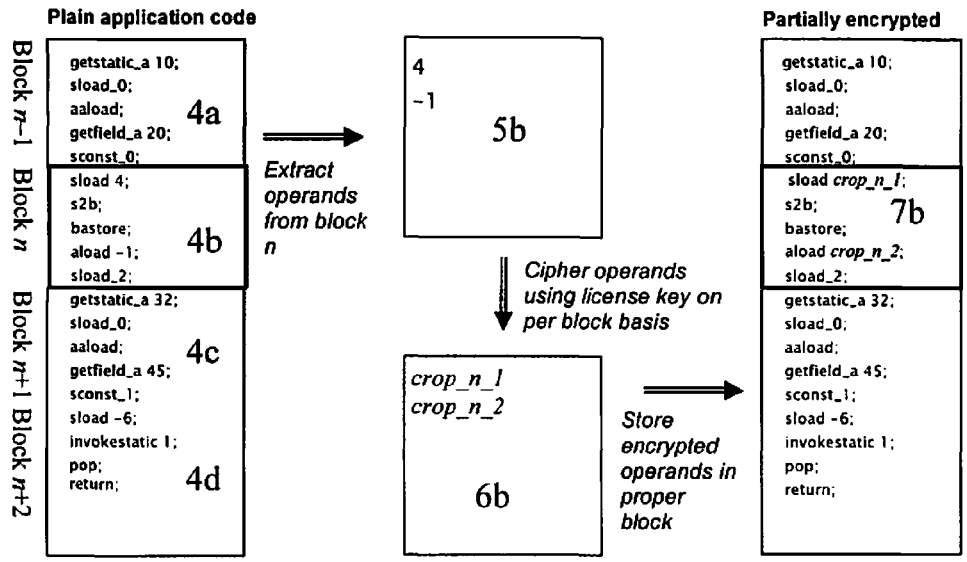
FIG. 11 schematically represents the collection of many operands to be encrypted in one-shot, according to the present invention.

As shown in FIG. 11, a collection of operands 5 may be made in a predetermined way. They can be repeated in the same way both by the generic server that encrypts the plain executable program 4, and by the system composed of the virtual machine or hardware processor 10 and the IC-card 19 that decrypts the executable program in an encrypted format 7.

For example, the plain executable program 4 can be divided in some blocks 4a, 4b, 4c, 4d of the same size. All operands 5a, 5b, 5c, 5d are extracted by the corresponding blocks, and encrypted with the license key 8 into encrypted operands 6a, 6b, 6c, 6d. After that, they can be re-aggregated in corresponding blocks of the executable program in an encrypted format 7a, 7b, 7c, 7d.

Figure 12:
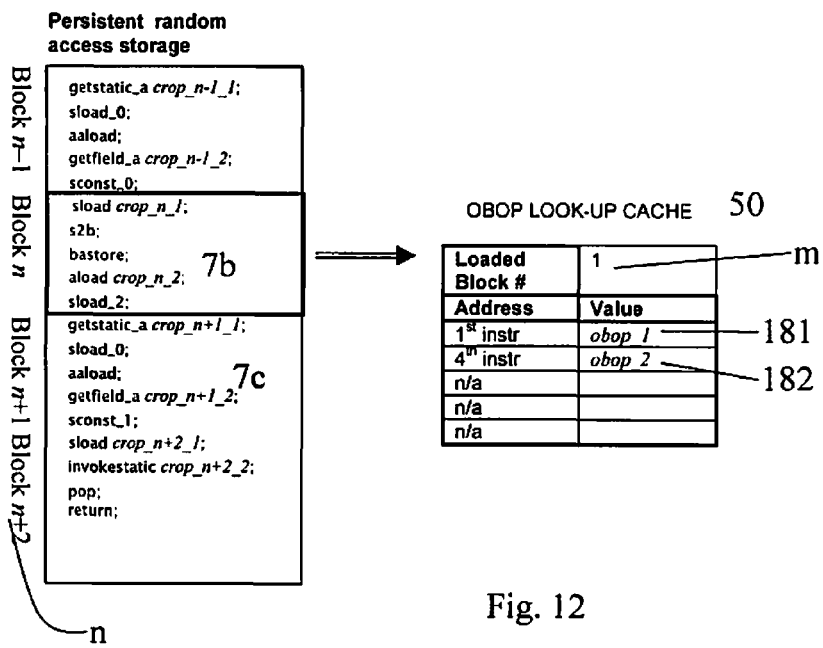
FIG. 12 represents an example of caching operands through an obscuration operand, LOOK UP CACHE, according to the present invention.

As shown in FIG. 12, when the virtual machine or hardware processor 10 tries to execute a block 7b, it performs a static look-ahead (i.e., not based on logic flow but on the address) of the code in the block, collects and aggregates the encrypted operands, and sends them to the IC-card 19. Data is then returned by the IC-card 19 in an obscured form 181, 182. The data is stored by the virtual machine or hardware processor 10 in a look-up table 50. Each obscured operand 181, 182 is associated to the address of the instruction it belongs to ($1^{st}$, $4^{th}$). In this manner, the virtual machine or hardware processor 10 can then locate the proper obscured operand 18 for each instruction $i^{th}$ during the actual code execution.

When execution continues in a new block 7c, the look-up table 50 is erased and filled in with obscured operands from the new block 7c. The virtual machine or hardware processor 10 knows if the look-up table 50 contains obscured operands 18 that belongs to the current block 7c because it compares the current block number "n" to the number reference "m" of the look up table 50.

The basic mechanism shown in FIG. 12, for example, the address in the first column of the look-up table 50 can be implicit, and multiple look-up tables 50 can be used to store simultaneously the obscured operands 18 that belong to more blocks, and so on. The machine architecture is eligible to be further specified in FIGS. 8, 9 and 10 in which some alternative configurations are schematically shown.

Figure 8:
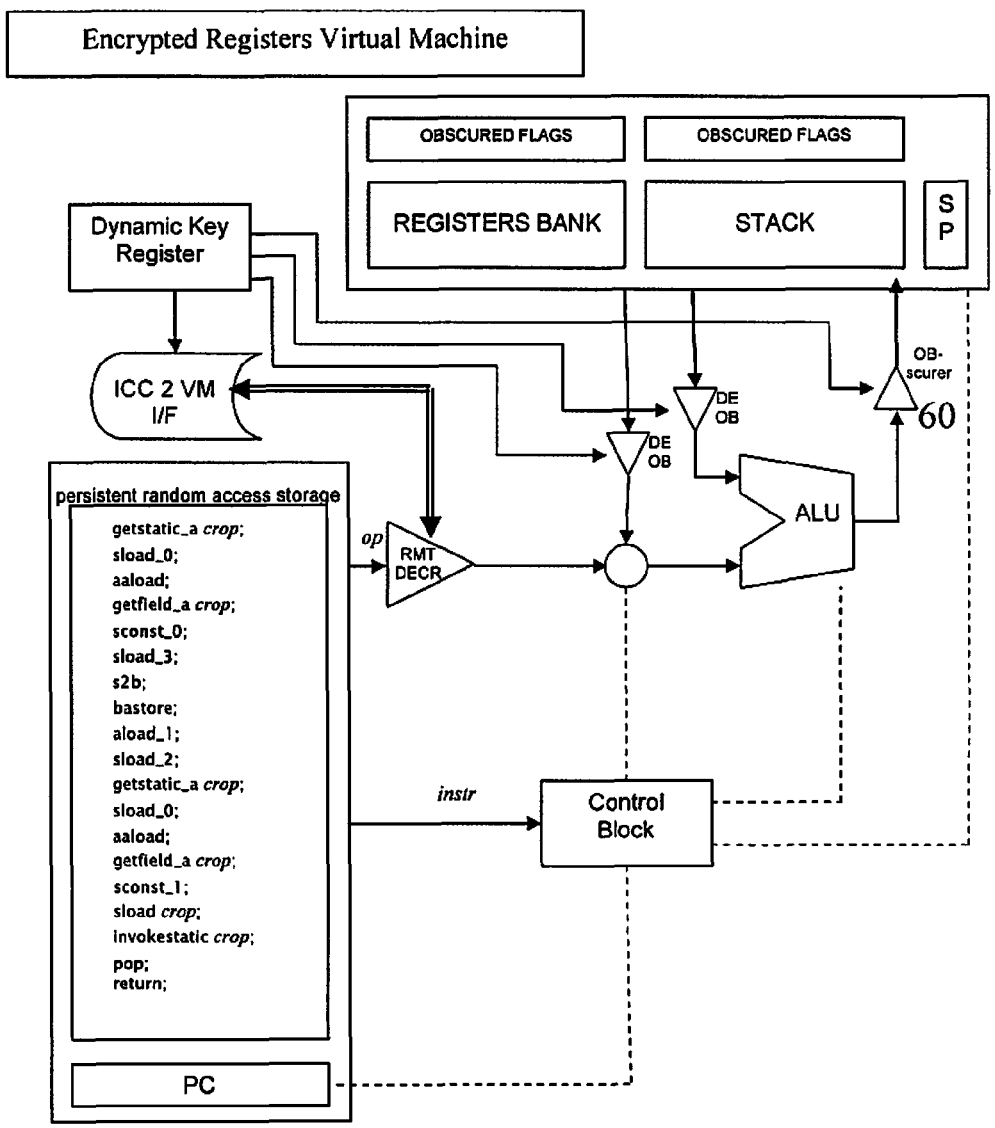
FIG. 8 shows an alternate configuration of the described architecture, according to the present invention, with relevant components not in grey with respect to FIG. 2.

With respect to FIG. 2, in FIG. 8 an obscurer block 60 is inserted on the line that carries results from the computational unit (ALU) to registers 14 or stack 13. This should be useful if the access to the registers 14 and/or the stack 13 by unauthorized entities is believed to likely occur. In FIG. 2, only encrypted operands 6, directly loaded from an executable program in an encrypted format 7, can be stored in an obscured manner in the registries 14 or the stack 13.

Figure 9:
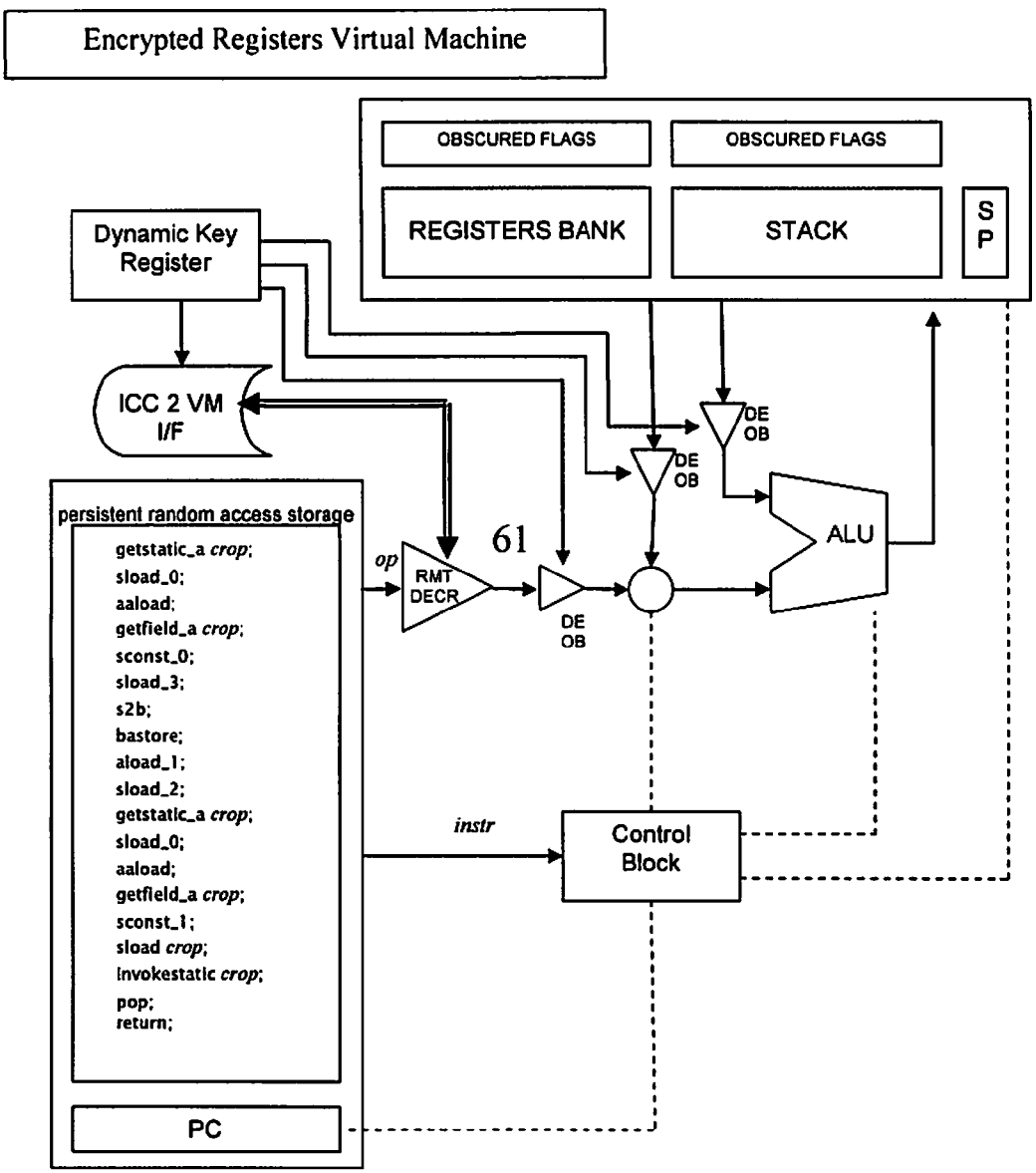
FIG. 9 shows another alternate configuration of the described architecture, according to the present invention, with relevant components not in grey with respect to FIG. 2.

In FIG. 9 a de-obscurer 61 is needed at an output of the Remote Decryption Unit 2 if the operand of instructions different from "load" (e.g., "add" operands and other arithmetic instructions) are allowed to be encrypted. In fact, both such operands and data retrieved from the registers 14 or the stack 13 are in plain form before feeding the ALU.

Other versions of possible architectures can be obtained by combining the structures shown in FIGS. 3, 8 and 9. It is worth noting that FIG. 9 is related to a programming model that provides instructions with none or a single operand. The illustrated embodiments can be extended to programming models where instructions with more than one operand are admitted. Multiple operands can be fetched and processed in a variety of manners (serially or parallel by micro-programs).

Figure 10:
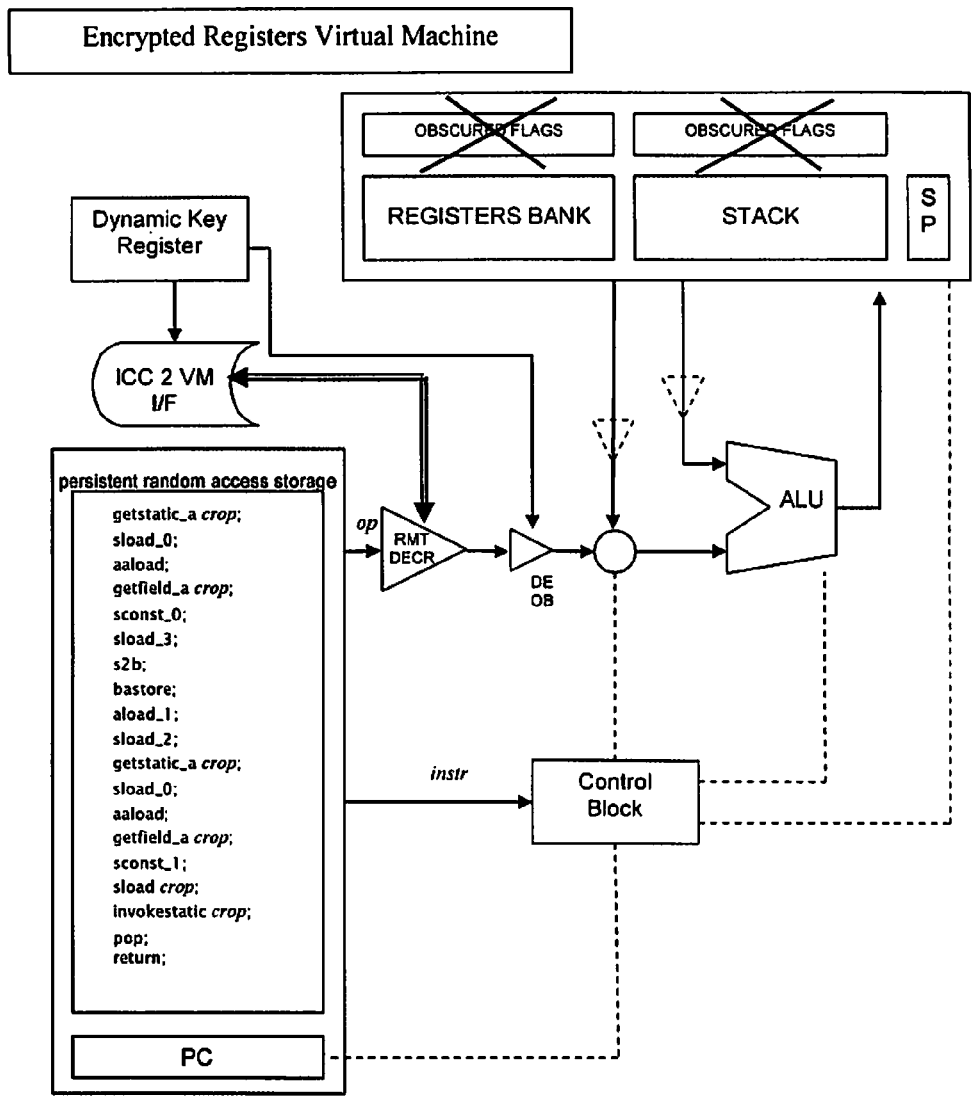
FIG. 10 shows yet another alternate configuration of the described architecture, according to the present invention, with relevant components not in grey with respect to FIG. 2.

If registers bank 14 and stack 13 are believed to have a high degree of protection, due to intrinsic architecture properties (in particular, in a hardware machine), the overall architecture can be simplified by removing obscured flags 43, 44 and most de-obscurer blocks 41, 42, 60, 61 but leaving a de-obscurer block 62 as output to the Remote Decrypter Unit 2, as shown in FIG. 10. In this case, the executable program is always stored in plain form in the registers bank 14 or the stack 13.

The same consideration made for a virtual machine also applies to a hardware machine. Such a machine will be named Encrypted Registers Machine Unit (CRPU). Some differences are expected in this case.

The architecture presented in FIG. 10 is particularly indicated for hardware context. In this case the stack is usually stored in a volatile memory unit outside the machine. On the other hand, a register bank, if present, shall be resident in the machine. Usually, but not always, machine register banks are more difficult to be read by an external malicious entity. In some cases, the hardware manufacturer can decide not to include the logic that obscures their contents, such as register de-obscurers, register obscured flags, and so on. This is not recommended since the registers can be read, depending on a general machine architecture and programming model. An interrupt service routine (ISR) may be called at each main program's instruction execution, for example.

In a hardware implementation stack, access instructions (push/pop) should be designed to manage extra data that trace the state of obscuring the stack of cells. For example, together with each word stored in the stack, an extra bit shall be present that specifies if a relevant word is obscured or not.

A virtual or hardware machine 10 is provided with a decryption method to execute an executable program in an encrypted format 7 stored in a non-volatile memory unit 1. The decryption method is applied at run-time. Advantageously, the executable program in an encrypted format 7 can be stored in a non-volatile memory 1 in a secure manner and used in a plain format during the execution.

Advantageously, an encryption may be executed with a ciphering algorithm of arbitrary complexity, for example, encrypting only sensitive data with a license key in a non-volatile memory and obscuring the data, when stored in internal registers or in a stack, with an internal dynamic key.

Run-time execution is made safer by obscuring the decrypted code, and de-obscuring it only when needed. The decryption is lightweight and the performance is not damaged due to a partial encryption of the plain executable code based on the encryption of only the operands 5 belonging to the plain executable program 4 in the encrypted operands 6.

That which is claimed:

1. An integrated circuit device comprising:
   a processor;
   a non-volatile memory for storing a plurality of executable programs in an encrypted format;
   a plurality of memory elements for storing a plurality of operands derived by the plurality of executable programs in the encrypted format during execution;
   a remote decryption unit for decrypting the plurality of executable programs and the plurality of derived operands in the encrypted format, with the encrypted format being derived by an encryption of a set of data of an executable program in a non-encrypted format;
   a re-encrypting circuit for re-encrypting the decrypted executable programs and the plurality of derived operands, including operands that are a result of an operation, with the re-encrypted executable programs and the plurality of derived operands being returned to said remote decryption unit; and
   an arithmetic logic unit between said remote decryption unit and said plurality of memory elements and is configured to receive the returned re-encrypted executable programs and the plurality of derived operands before storing said plurality of memory elements.

2. The integrated circuit device according to claim 1, wherein said processor comprises a hardware processor.

3. The integrated circuit device according to claim 1, wherein said processor comprises a virtual machine.

4. The integrated circuit device according to claim 1, wherein more than one operand of the plurality of derived operands are derived by a same encryption function through said re-encrypting circuit.

5. The integrated circuit device according to claim 1, further comprising an obscuration circuit cooperating with said re-encrypting circuit for performing the re-encryption through an obscuration of operands and de-obscuration of obscured operands of the plurality of derived operands, with the re-encrypting being more complex with respect to the encryption of a predefined set of data.

6. The integrated circuit device according to claim 5, wherein said obscuration circuit indicates when said plurality of memory elements stores the obscured operands.

7. The integrated circuit device according to claim 1, wherein said re-encrypting circuit stores a license key for executing the plurality of executable programs in the encrypted format.

8. The integrated circuit device according to claim 7, wherein said re-encrypting circuit comprises an interface for reading said non-volatile memory and for decrypting the executable programs in the encrypted format into plain executable programs.

9. The integrated circuit device according to claim 8, wherein said interface decrypts only a portion of the executable programs in the encrypted format into a corresponding portion of the plain executable programs.

10. The integrated circuit device according to claim 9, wherein the executable programs in the encrypted format comprise a plurality of encrypted operands and a plurality of data in plain format, and wherein said interface decrypts only the encrypted operands of the executable programs in the encrypted format into decrypted operands.

11. The integrated circuit device according to claim 10, wherein said remote decryption unit detects if an instruction contains encrypted operands and enables decryption by said interface upon detection of one of the encrypted operands.

12. The integrated circuit device according to claim 7, wherein said re-encrypting circuit decrypts encrypted operands through the license key.

13. The integrated circuit device according to claim 7, wherein a dynamic obscuration key is periodically generated and stored both in said re-encrypting circuit and in said non-volatile memory.

14. The integrated circuit device according to claim 13, wherein said re-encrypting circuit obscures the decrypted operands into obscured operands through the dynamic obscuration key.

15. The integrated circuit device according to claim 14, wherein the derived operands comprise obscured operands.

16. The integrated circuit device according to claim 14, wherein said re-encrypting circuit returns the obscured operands to said remote decryption unit.

17. The integrated circuit device according to claim 14, wherein the obscured operands are loaded in said plurality of memory elements and marked by obscure flags.

18. The integrated circuit device according to claim 14, wherein said re-encrypting circuit performs a de-obscuration operation on the obscured operands through the dynamic obscuration key before sending them to said arithmetic logic unit.

19. The integrated circuit device according to claim 14, wherein said re-encrypting circuit prevents detection of a plain value of the derived operators when they are temporarily stored in said non-volatile memory.

20. The integrated circuit device according to claim 1, further comprising additional obscurator and de-obscurator units to prevent a detection of operands on a flow that starts from loading of the encrypted operands into said remote de-encryption unit until the processing of a corresponding plain value through said arithmetic logic unit.

21. An integrated circuit card comprising:
   a substrate;
   a non-volatile memory on said substrate for storing a plurality of executable programs in an encrypted format;
   a plurality of memory elements for storing a plurality of operands derived by the plurality of executable programs in the encrypted format during execution;
   a remote decryption unit on said substrate for decrypting the plurality of executable programs and the plurality of derived operands in the encrypted format, with the encrypted format being derived by an encryption of a set of data of an executable program in a non-encrypted format;
   a re-encrypting circuit on said substrate for re-encrypting the decrypted executable programs and the plurality of derived operands, including operands that are a result of an operation, with the re-encrypted executable programs and the plurality of derived operands being returned to said remote decryption unit; and
   an arithmetic logic unit between said remote decryption unit and said plurality of memory elements and is configured to receive the returned re-encrypted executable programs and the plurality of derived operands before storing in said plurality of memory elements.

22. The integrated circuit card according to claim 21, wherein more than one operand of the plurality of derived operands are derived by a same encryption function through said re-encrypting circuit.

23. The integrated circuit card according to claim 21, and further comprising an obscuration circuit on said substrate and cooperating with said re-encrypting circuit for performing the re-encryption through an obscuration of operands and de-obscuration of obscured operands of the plurality of derived operands, with the re-encrypting being more complex with respect to the encryption of a predefined set of data.

24. The integrated circuit card according to claim 23, wherein .said obscuration circuit indicates when said plurality of memory elements stores the obscured operands.

25. The integrated circuit card according to claim 21, wherein said re-encrypting circuit stores a license key for executing the plurality of executable programs in the encrypted format.

26. The integrated circuit card according to claim 25, wherein said re-encrypting circuit comprises an interface for reading said non-volatile memory and for decrypting the executable programs in the encrypted format into plain executable programs.

27. A method for encrypting and decrypting data in a processor for a portable electronic device, the portable electronic device comprising a non-volatile memory, a plurality of memory elements a remote decryption unit and a re-encrypting circuit, and an arithmetic logic unit between the remote decryption unit and the plurality of memory elements, the method comprising:

storing a plurality of executable programs in an encrypted format in the non-volatile memory;

storing in the plurality of memory elements a plurality of operands derived by the plurality of executable programs in the encrypted format during execution;

decrypting by the remote decryption unit the plurality of executable programs and the plurality of derived operands in the encrypted format, with the encrypted format being derived by an encryption of a set of data of an executable program in a non-encrypted format;

re-encrypting by the re-encrypting circuit the decrypted executable programs and the plurality of derived operands, including operands that are a result of an operation, with the re-encrypted executable programs and the plurality of derived operands being returned to the remote decryption unit; and providing the returned re-encrypted executable programs and the plurality of derived operands from the remote decryption unit to the arithmetic logic unit before storing in the plurality of memory elements.

28. The method according to claim 27, wherein more than one operand of the plurality of derived operands are derived by a same encryption function through the re-encrypting circuit.

29. The method according to claim 27, wherein the portable electronic device further comprises an obscuration circuit cooperating with the re-encrypting circuit for performing the re-encryption through an obscuration of operands and de-obscuration of obscured operands of the plurality of derived operands, with the re-encrypting being more complex with respect to the encryption of a predefined set of data.

30. The method according to claim 29, wherein the obscuration circuit indicates when the plurality of memory elements stores the obscured operands.

31. The method according to claim 27, wherein the re-encrypting circuit stores a license key for executing the plurality of executable programs in the encrypted format.

32. The method according to claim 31, wherein the re-encrypting circuit comprises an interface for reading the non-volatile memory and for decrypting the executable programs in the encrypted format into plain executable programs.

* * * * *

UNITED STATES PATENT AND TRADEMARK OFFICE
CERTIFICATE OF CORRECTION

| | |
|---|---|
| PATENT NO. | : 8,745,407 B2 |
| APPLICATION NO. | : 11/912936 |
| DATED | : June 3, 2014 |
| INVENTOR(S) | : Francesco Varone, Pasquale Vastano and Amedeo Veneroso |

It is certified that error appears in the above-identified patent and that said Letters Patent is hereby corrected as shown below:

In the Claims

Column 9, Line 38,         Delete: "storing"
Claim 1                    Insert: --storing in--

Signed and Sealed this
Thirtieth Day of June, 2015

Michelle K. Lee
*Director of the United States Patent and Trademark Office*